(12) United States Patent
Surnilla et al.

(10) Patent No.: US 9,038,580 B2
(45) Date of Patent: May 26, 2015

(54) METHOD AND SYSTEM FOR ENGINE DILUTION CONTROL

(75) Inventors: Gopichandra Surnilla, West Bloomfield, MI (US); Thomas G. Leone, Ypsilanti, MI (US); Brad Alan VanDerWege, Plymouth, MI (US); Christopher House, Belleville, MI (US); Michael Howard Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 427 days.

(21) Appl. No.: 13/401,713

(22) Filed: Feb. 21, 2012

(65) Prior Publication Data

US 2013/0218438 A1    Aug. 22, 2013

(51) Int. Cl.
*F02B 47/02* (2006.01)
*F02D 41/00* (2006.01)
*F02D 21/08* (2006.01)

(52) U.S. Cl.
CPC .......... *F02D 41/0025* (2013.01); *F02D 41/005* (2013.01); *Y02T 10/47* (2013.01); *F02D 2021/083* (2013.01)

(58) Field of Classification Search
CPC ..... Y02T 10/47; Y02T 10/46; F02D 41/0025; F02D 41/001; F02D 2041/001; F02D 41/005
USPC ................. 701/102, 103, 105, 108; 60/605.1, 60/605.2; 123/1 A, 25 C, 406.29, 406.47, 123/435, 568.11
See application file for complete search history.

(56) References Cited

U.S. PATENT DOCUMENTS

| | | | |
|---|---|---|---|
| 5,664,544 A | 9/1997 | Tomisawa | |
| 6,112,705 A * | 9/2000 | Nakayama et al. | 123/25 C |
| 6,601,387 B2 * | 8/2003 | Zurawski et al. | 60/605.2 |
| 7,334,573 B2 * | 2/2008 | Shiraishi et al. | 123/568.14 |
| 8,061,117 B2 * | 11/2011 | Cheng | 60/39.281 |
| 8,074,630 B2 * | 12/2011 | Sasaki et al. | 123/568.22 |
| 8,224,555 B2 * | 7/2012 | Kumano et al. | 701/104 |
| 2006/0037563 A1 * | 2/2006 | Raab et al. | 123/25 C |
| 2006/0162689 A1 * | 7/2006 | Winkelman et al. | 123/299 |
| 2007/0215126 A1 | 9/2007 | Shiraishi et al. | |
| 2008/0022686 A1 * | 1/2008 | Amdall et al. | 60/716 |
| 2008/0264036 A1 * | 10/2008 | Bellovary | 60/274 |
| 2009/0266345 A1 * | 10/2009 | Sasaki et al. | 123/568.22 |
| 2009/0292441 A1 | 11/2009 | Kawai et al. | |
| 2010/0121559 A1 * | 5/2010 | Bromberg et al. | 701/111 |
| 2011/0174267 A1 | 7/2011 | Surnilla et al. | |

* cited by examiner

*Primary Examiner* — Stephen K Cronin
*Assistant Examiner* — Joseph Dallo
(74) *Attorney, Agent, or Firm* — Julia Voutyras; Alleman Hall McCoy Russell & Tuttle, LLP (57) ABSTRACT

Methods and systems are provided for enabling engine dilution control. One or more engine diluents are combined to provide a desired engine dilution, the various diluents selected based on their respective combustion stability limits. A ratio of the various diluents used is further adjusted based on engine operating limitations.

19 Claims, 7 Drawing Sheets

METHOD AND SYSTEM FOR ENGINE DILUTION CONTROL

FIELD

The present application relates to methods and systems for controlling use of various diluents in an internal combustion engine, such as EGR, for example.

BACKGROUND AND SUMMARY

Engines may be configured with exhaust gas recirculation (EGR) systems to divert at least some exhaust gas from an engine exhaust manifold to an engine intake manifold. By providing a desired engine dilution, such systems reduce engine knock, throttling losses, as well as NOx emissions. Still other diluents may be used. For example, engine dilution may be achieved by direct injecting water or performing a lean combustion.

One example approach for coordinating engine dilution control via the use of different diluents is shown by Surnilla et al. in US 2011/0174267. Therein, a direct injection of water is coordinated with EGR flow to provide a desired engine dilution while addressing EGR transients. In particular, in response to a sudden request for engine dilution (such as during a tip-in), an EGR flow is increased while water is direct injected to substantially immediately provide the desired dilution. Then, the water injection is decreased as the EGR flow increases to the desired dilution level. In addition, load leveling may be performed with the different diluents in anticipation of load changes.

However, the inventors herein have identified a potential issue with such a system. Specifically, engine dilution may degrade engine combustion stability wherein the combustion stability limit is different for each diluent used. That is, the engine may have a combustion tolerance limit for EGR, an equivalent tolerance limit for lean combustion, and likewise an equivalent combustion limit for water vapor. Therefore, when a combination of diluents are used, the combustion stability limit of each diluent may be affected by the amount of dilution already in place, as well as the nature of the diluent already in use. In other words, an amount of water that can be direct injected to provide engine dilution may be affected not only by the combustion stability limits of direct injected water, but also by the combustion stability limits of the amount of EGR in place, the amount of lean combustion in place, etc.

Thus in one example, some of the above issues may be at least partly addressed by a method of operating an engine comprising, providing a desired engine dilution by combining a plurality of engine diluents, the diluents selected based on respective combustion stability limits. In this way, engine dilution may be better controlled by taking into consideration the combustion stability limits and interactions of each diluent used.

For example, an engine controller may translate each available diluent into elemental constituents, and determine a combustion stability limit for that diluent based on the concentration of each elemental constituent. Other combustion related parameters, such as ignition timing, exhaust temperature, feed-gas emissions, etc., may also be determined based on the elemental composition of the diluents. As an example, a combustion stability limit for EGR-based dilution may be determined as a function of the carbon dioxide concentration, the nitrogen concentration, and the water concentration of the available EGR. As another example, a combustion stability limit for lean combustion-based dilution may be determined as a function of the oxygen concentration and the nitrogen concentration of the available lean combustion. The controller may then select one or more engine diluents from the available diluents based on the respective combustion stability limits. For example, a first diluent may be selected having the highest combustion stability limit to provide at least some of the desired dilution. After the first diluent reaches its combustion stability limit, a remainder of the desired dilution may then be provided by a second diluent having the next highest stability limit, and so on.

In this way, a controller may select one or more engine diluents to provide an engine dilution to reduce a likelihood of engine knock. By mapping the engine based on the combustion stability limits of the available diluents, engine dilution control may be improved. Specifically, engine performance and diluent usage may be improved, while providing all the knock-addressing benefits of the engine dilution, and without degrading combustion stability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
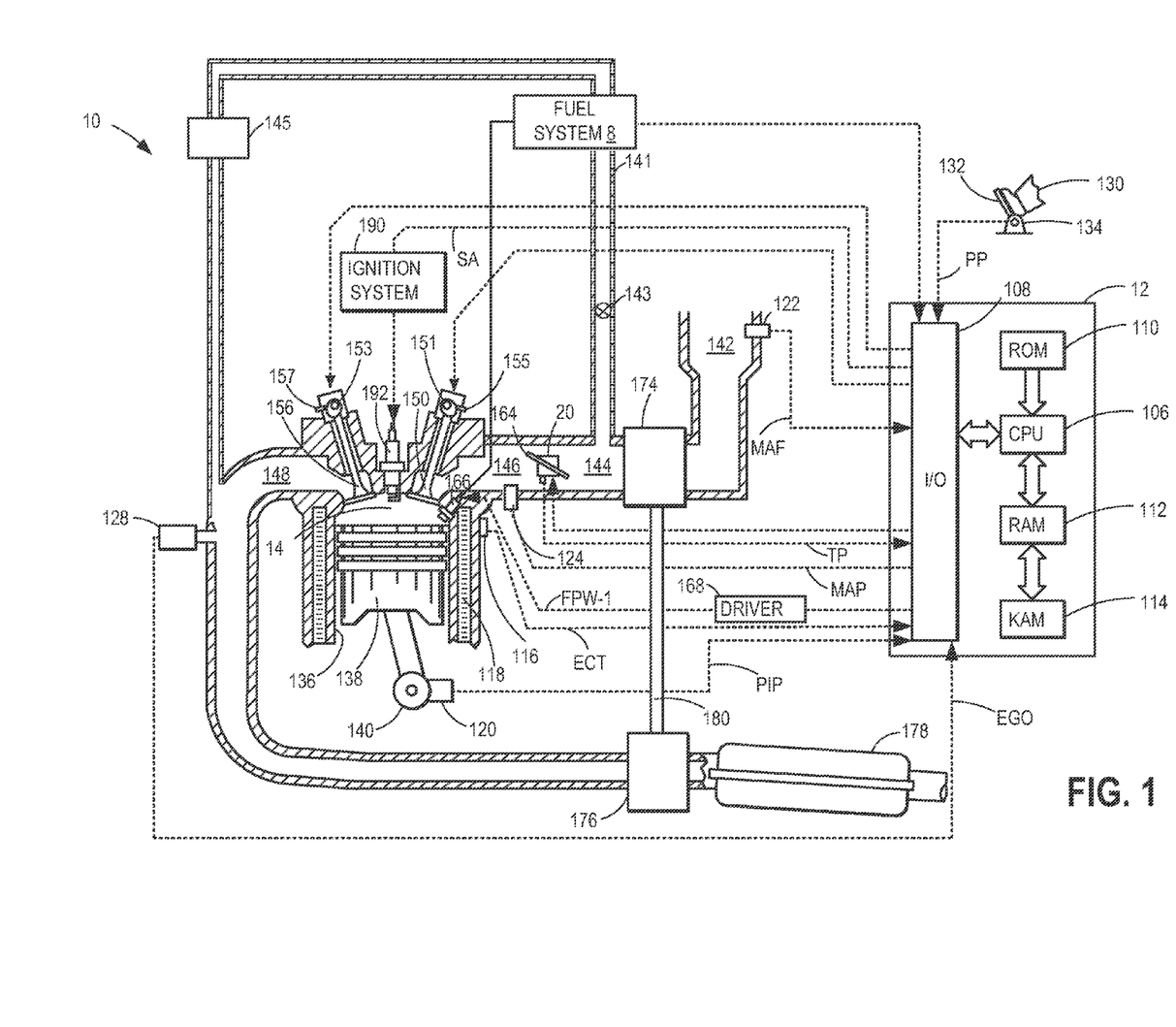
FIG. 1 shows an example embodiment of an engine combustion chamber.

The following description relates to systems and methods for improving dilution control in flex-fueled engines, such as the engine of FIG. 1. Based on engine operating conditions, including a likelihood of engine knock, an engine controller may determine a desired amount of engine dilution. The controller may then combine one or more diluents to provide the desired dilution. The controller may be configured to perform control routines, such as those of FIGS. 2-4 to select the diluents based on their combustion stability limits. The controller may further adjust a ratio of the selected diluents based on engine operating limitations, as shown in FIG. 5. An example of combining different diluents to provide a desired engine dilution is show herein at FIG. 6. In this way, dilution control may be achieved.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. As elaborated with reference to FIGS. 6 and 12, a cam timing may be adjusted (by advancing or retarding the VCT system) to adjust an engine dilution in coordination with an EGR flow and/or a direct injection of a knock control fluid, thereby reducing EGR transients and improving engine performance.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock control fluid thereto. In some embodiments, the knock control fluid may be a fuel, wherein the injector is also referred to as a fuel injector. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while in one embodiment, the engine may be operated by injecting the variable fuel or knock control fluid blend via a single direct injector; in alternate embodiments, the engine may be operated by using two injectors (a direct injector 166 and a port injector) and varying a relative amount of injection from each injector.

Fuel may be delivered by the injector to the cylinder during a single cycle of the cylinder. Further, the distribution and/or relative amount of fuel or knock control fluid delivered from the injector may vary with operating conditions, such as air-charge temperature, as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel or knock control fluids with different qualities, such as different compositions. These differences may include different alcohol content, different water content, different octane, different heat of vaporizations, different fuel blends, different water contents, and/or combinations thereof etc. In one example, knock control fluids with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, latent enthalpy of vaporization etc.

Moreover, fuel characteristics of the fuel or knock control fluid stored in the fuel tank may vary frequently. In one example, a driver may refill the fuel tank with E85 one day, and E10 the next, and E50 the next. The day to day variations in tank refilling can thus result in frequently varying fuel compositions, thereby affecting the fuel composition delivered by injector 166.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 148 may be varied by controller 12 via EGR valve 143. Further, an EGR sensor 145 may be arranged within the EGR passage and may provide an indication of one or more pressure, temperature, and concentration of the exhaust gas.

It will be appreciated that while the embodiment of FIG. 1 shows low pressure (LP-EGR) being provided via an LP-EGR passage coupled between the engine intake upstream of the turbocharger compressor and the engine exhaust downstream of the turbine, in alternate embodiments, the engine may be configured to also provide high pressure EGR (HP-EGR) via an HP-EGR passage coupled between the engine intake downstream of the compressor and the engine exhaust upstream of the turbine. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. When distinct HP-EGR and LP-EGR passages are included, the respective EGR flows may be controlled via adjustments to respective EGR valves.

Figure 2A:
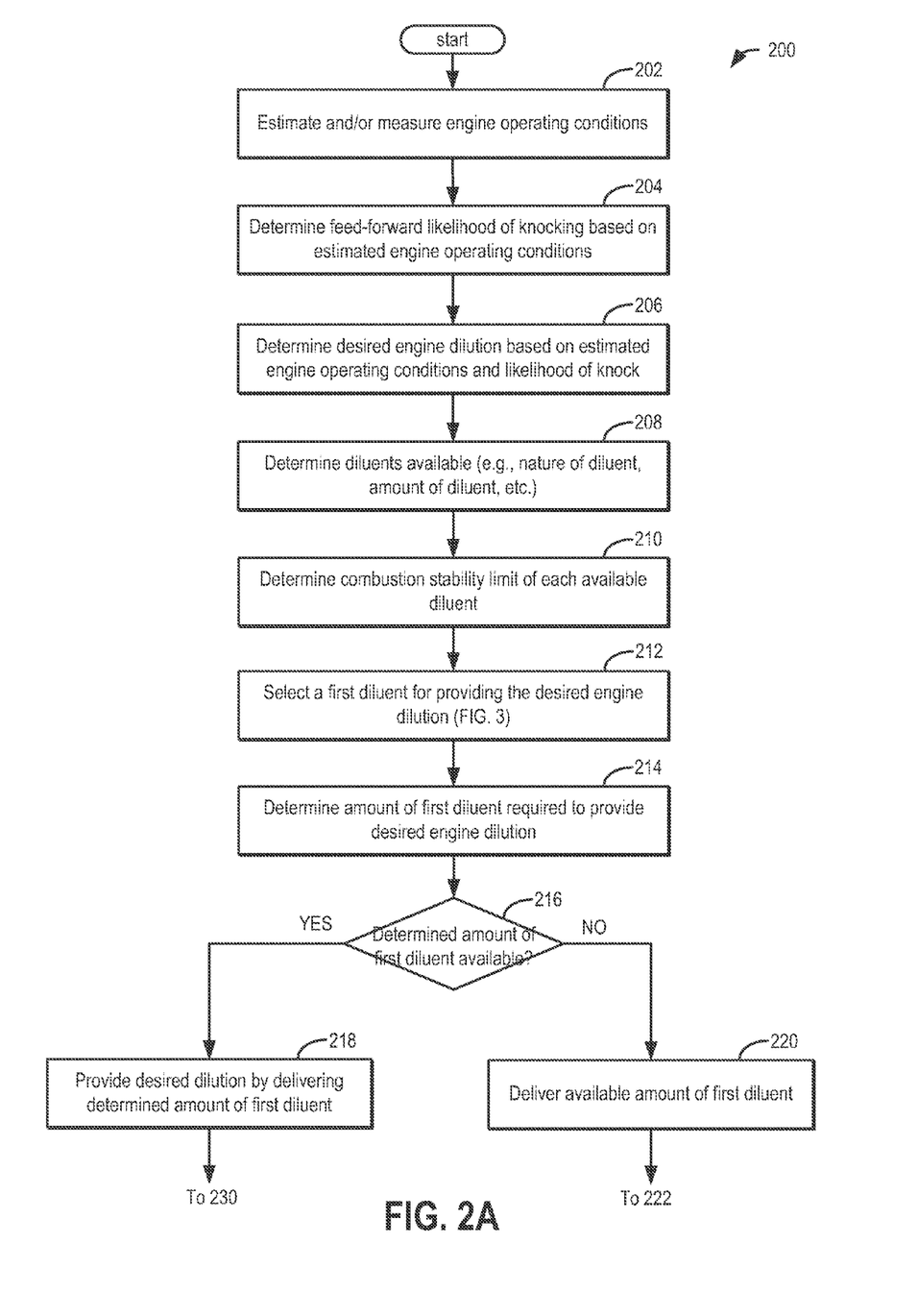
FIGS. 2A-2B show a high level flow chart illustrating a routine for combining one or more diluents to address engine knock based on the combustion stability limit of each diluent.
Figure 2B:
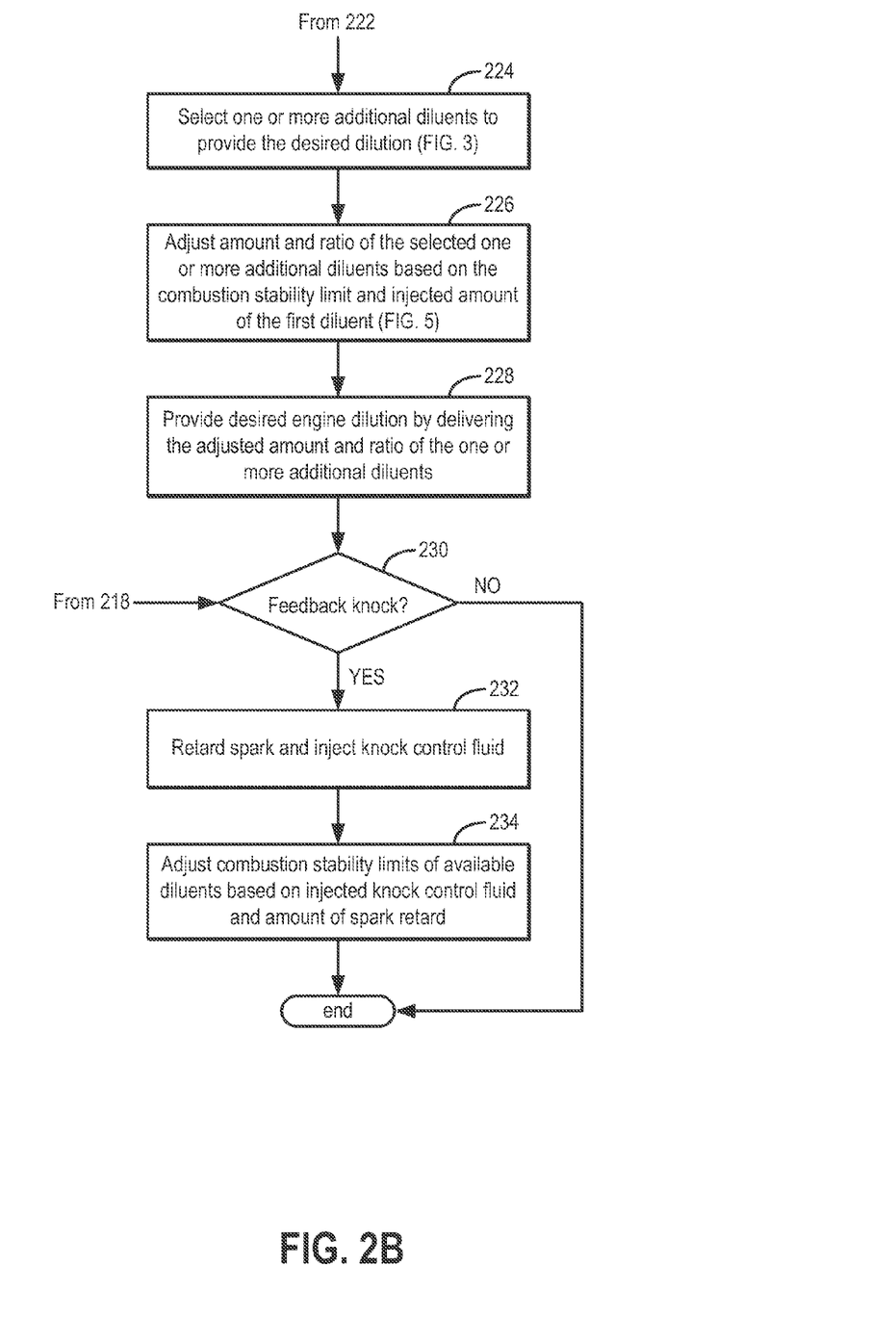

As such, EGR is one diluent that may be used to provide an amount of engine dilution. Still other engine diluents may be included in the engine system wherein each diluent is configured to dilute the air and fuel charge in the cylinder. As non-limiting examples, the engine system may be configured to direct inject a diluent such as water or other non-combustible matter that can take up space in the cylinder and absorb heat of combustion. In still another example, the controller may be configured to provide engine dilution by adjusting a valve timing (e.g., via adjustments to a VVT or VCT setting) to thereby adjust an amount of exhaust residuals. Specifically, the adjusted valve timing setting may vary a portion of combustion gases that are retained or trapped in the cylinder, thereby affecting cylinder dilution. Other diluents could include alcohol plus water such as hydrous ethanol (e.g. windshield washer fluid), or humidity (water from air) or fuel enrichment. As elaborated in FIGS. 2-3, based on engine operating conditions, a controller may use one or more diluents to provide a desired amount of engine dilution. The combination of diluents may be selected based on combustion stability limits of the various diluents. As such, the combustion stability limit of the diluents may refer to limits beyond which there may be an increased likelihood of degraded combustion including partial burns, misfires, increased exhaust emissions, and/or reduced torque output from the cylinder.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

In this way, the system of FIG. 1 enables a method of operating an engine wherein a desired engine dilution is provided by combining a plurality of engine diluents, the diluents selected based on respective combustion stability limits.

Now turning to FIGS. 2A-2B, an example method 200 is shown for combining one or more diluents to address engine knock based on the combustion stability limit of each diluents. Specifically, the method enables a combination of diluents to be selected to address feed-forward knock, and then adjusts feedback knock with a knock control fluid.

At 202, the method includes estimating and/or measuring engine operating conditions. These may include, for example, engine speed, desired torque, MAP, BP, ECT, catalyst temperature, intake temperature, spark timing, boost, etc. At 204, a feed-forward likelihood of engine knocking may be determined based on the estimated engine operating conditions. At 206, a desired engine dilution may be determined based on the estimated engine operating conditions as well as the determined feed-forward likelihood of knock. That is, an engine dilution required to address the anticipated knock is determined.

At 208, the method includes determining the diluents available under the given engine operating conditions. This may include determining the nature of the diluents available, as well as the amount of each available diluent. In one example, the available diluents may be mapped and stored in the controller based on engine speed-load conditions. As previously elaborated, the engine diluents may refer to non-combustible matter that take up space in the cylinder and can absorb heat of combustion, for example. The various diluents available may include, for example, recirculated exhaust gas (EGR), water, one or more alcohols such as methanol and ethanol, a change in variable cam timing (VCT), a change in valve timing, lean combustion, etc.

At 210, a combustion stability limit of each available diluent may be determined. A combustion stability limit of each diluent may be based on a type of the diluent. For example, based on whether the diluent is a liquid diluent or a gaseous diluent. As another example, it may be determined whether the diluent is EGR or direct injected water, or an adjusted VCT setting. Further, the combustion stability limit of a diluent may be based on a concentration of each elemental constituent of the diluent. For example, a combustion stability limit of the diluent EGR is based on each of a carbon dioxide concentration, a nitrogen concentration, and a water concentration of the recirculated exhaust gas. As another example, a combustion stability limit of engine dilution from lean combustion is based on each of a nitrogen concentration, and an oxygen concentration of the lean combustion. As still another example, a combustion stability limit of humidity is based on water content. Thus, as elaborated below, when a combination of diluents is used, a combustion stability limit of the combination may be computed based on the total concentration of the various elemental constituents present in the combination.

In one example, a first diluent (or a first group of diluents) may be mapped based on engine speed-load conditions, and the combustion stability limits (or tolerance limits) as well as other combustion parameters of the remaining diluents may be deduced or extrapolated based on the mapped data (including the combustion stability limit and other combustion parameters) of the first diluent (or first group of diluents). As such, this may reduce the amount of engine mapping and calibration work required.

At 212, the method includes selecting a first diluent to provide the desired engine dilution. Then, at 214, an amount of the first diluent required to provide the desired dilution may be determined. As elaborated with reference to FIG. 3, selecting the first diluent may include selecting a first diluent which has the highest combustion stability limit to provide at least some of the desired engine dilution. Then, after the first diluent reaches its first combustion stability limit, or if the first diluent cannot provide all of the desired engine dilution, a second diluent with a second combustion stability limit that is lower than the first combustion stability limit (e.g., a diluents with the next highest combustion stability limit) may be selected to provide a remainder of the desired engine dilution. Likewise, additional diluents may be selected in order of decreasing combustion stability limit (or range) until the desired dilution is provided.

At 216, it may determine if the required amount of first diluent is available for providing the desired engine dilution. For example, if the first diluent selected is EGR, an amount of EGR required to provide the desired dilution (e.g., amount "X") may be determined, and it may confirmed if the required amount of EGR is available. If yes, then at 218, the desired dilution may be provided by delivering (e.g., injecting) the determined amount (e.g., amount "X") of first diluent. Herein, the desired dilution is provided solely by the selected first diluent. That is, the feed-forward indication of knock is addressed by diluting the engine with the first diluent. The method may then proceed to 230 to determine if there is a feedback indication of knock, and take mitigating steps accordingly, as elaborated below.

If the required amount of diluent is not available, then at 220, the available amount of first diluent (e.g., amount "Y") may be delivered (e.g., injected). Herein, the desired dilution is provided in part by the selected first diluent. Engine dilution corresponding to the remaining amount (e.g., "Y-X") may then be provided by one or more other diluents. Accordingly, at 224, one or more additional diluents may be selected to provide the desired dilution. As elaborated with reference to FIG. 3, this may include selecting diluents in a decreasing order of combustion stability and/or selecting a second diluent after the first diluent has reached its combustion stability limit, selecting a third diluent after the second diluent has reached its combustion stability limit, and so on. Next, at 226, an amount of each selected (additional) diluent may be adjusted based on the combustion stability limit of each diluent in the combination, as well as based on the delivered (or injected) amount of the first diluent.

Additionally, as elaborated with reference to FIG. 5, a ratio of each of the selected diluents may be adjusted based on the combustion stability limit of each diluent in the combination, as well as various engine operating limitations. These may include, for example, constraints on exhaust emissions (e.g., particulate matter emissions), engine component temperature constraints (e.g., exhaust temperature limitations), constraints related to abnormal combustion events (e.g., pre-ignition), etc. Based on those limitations, a ratio of the selected diluents may be adjusted. For example, the amount of an initially selected diluent may be decreased while the amount of an alternate diluent may be increased to reduce particulate matter emissions under the given engine speed-load conditions. At 228, the desired engine dilution may be provided by delivering the adjusted amounts (and ratios) of the one or more selected diluents.

As such, the desired engine dilution is based on a feed-forward indication of knock, and in response to a feedback indication of knock, the controller may further injecting a knock control fluid and adjusting a combustion stability limit of the EGR and the engine diluent based on the injected knock control fluid. Specifically, at 230, after providing the desired dilution (via only the first diluent at 218, or via the combination of diluents at 228), it may be determined if there is an indication of feedback knock. That is, it may be determined if the engine is currently knocking. In one example, feedback knock may be determined by a knock sensor coupled to the engine. If no feedback knocking has occurred, the routine may end. That is, if no feedback knock is indicated, the engine may continue to be operated with one or more engine diluents being delivered to address the anticipated amount of knock. If feedback knock is determined, then at 232, spark ignition timing may be retarded and/or a knock control fluid may be injected to address the knock. The knock control fluid may include a fuel with a high effective octane content, for example, an alcohol. Various knock control fluid used by the engine system of FIG. 1 may include, for example, ethanol, methanol, gasoline, water, and combinations thereof. The effective octane content of the knock control fluid may be based on the fluid's inherent octane, a dilution effect of the fluid, as well as an evaporation effect of the fluid. Thus, for example, an ethanol fuel blend (such as E85) may be directly injected into a cylinder in response to feedback knock to take advantage of the inherently high octane number of the fuel (inherent high octane content), and the charge cooling effect of the ethanol fuel (high evaporative octane content).

The amount of spark retard used, the amount of knock control fluid injected, as well as a ratio of the spark retard to knock control fluid injected may be based on the effective octane content and dilution effect of the injected knock control fluid and the fuel penalty incurred by the spark retard. For example, based on engine operating conditions, it may be more fuel efficient to address feedback knock with only spark retard during some conditions, but more fuel efficient to address feedback knock with only a knock control fluid injection during other conditions. During still other conditions, it may be more fuel efficient to retard spark up to a threshold amount of spark retard, and then inject a knock control fluid.

At 234, after using the determined amount of spark retard and/or knock control fluid to address the feedback knock, the combustion stability limits of the available diluents may be adjusted. For example, the combustion stability limit for EGR used as a diluent may be adjusted to compensate for potential EGR transients and torque transients.

In this way, engine knock may be addressed by using one or more engine diluents, the combination of diluents selected based on the combustion stability limits of the diluents. This may allow the desired dilution to be provided without incurring combustion constraints, or torque transients. Further, engine mapping and calibration may be simplified.

Figure 3:
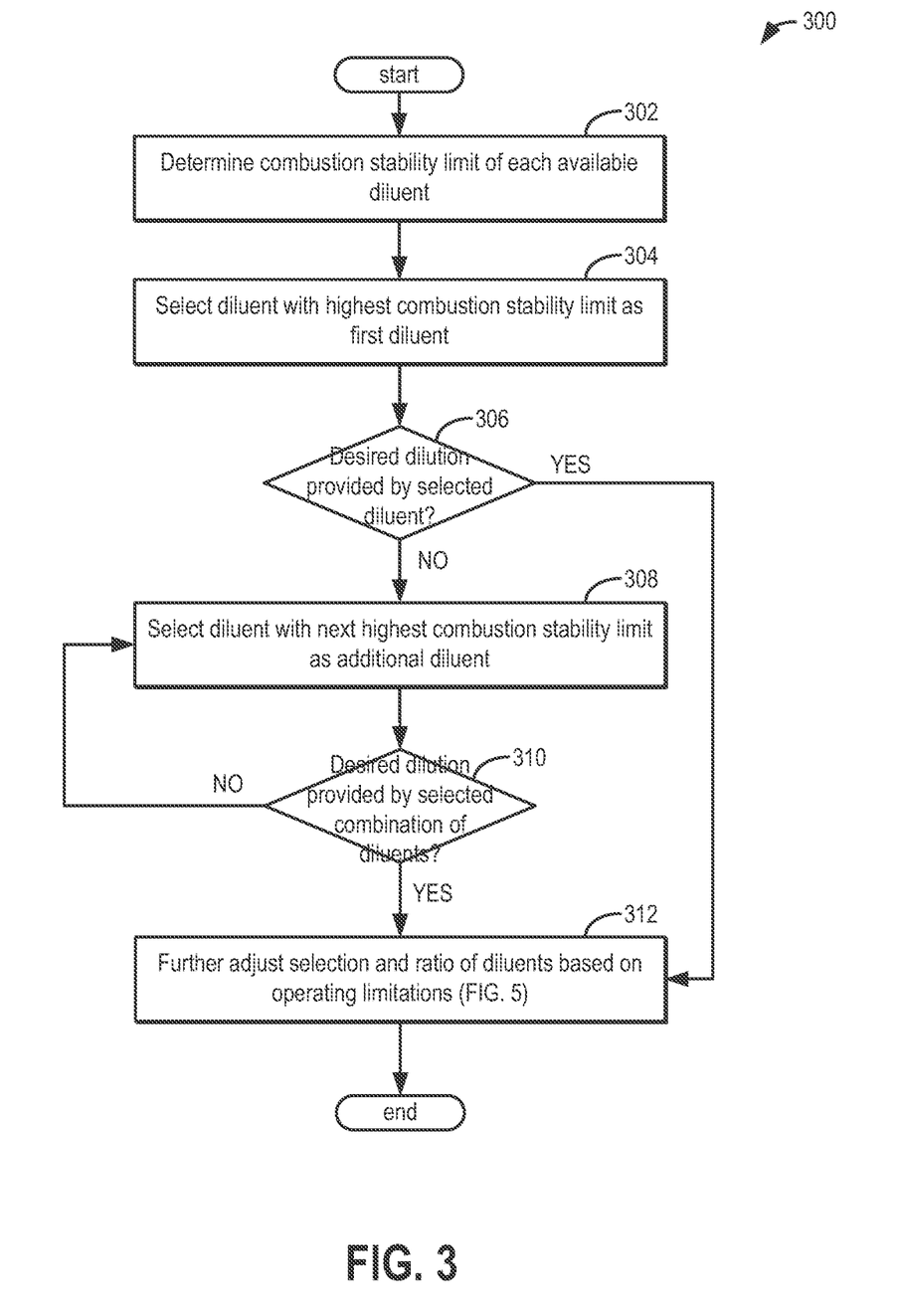
FIG. 3 shows a high level flow chart for selecting a combination of diluents based on the combustion stability limit of each diluent.

Now turning to FIG. 3, an example method 300 is shown for selecting and combining one or more diluents based on their combustion stability limits to provide a desired amount of engine dilution.

At 302, the method includes determining the combustion stability limit of each available diluent. As previously elaborated with reference to FIG. 2, this includes determining the combustion stability limit of each diluent based on the nature of the diluent as well as the elemental composition of the diluent. For example, the combustion stability limit of EGR may be determined as a function of the $CO_2$, $N_2$ and water concentration of the EGR.

Next, at 304, the diluent with the highest combustion stability limit may be selected as the first diluent for use in providing a desired engine dilution. Thus, for any two diluents, the diluent with the higher (or highest) combustion stability limit may be selected as the first diluent while the diluent with the lower (or next highest) combustion stability limit may be selected as the second diluent. Further, the selected diluent may also have the widest combustion stability range. For example, for any two diluents having the same combustion stability limit, the diluent with the wider combustion stability limit may be selected as the first diluent while the diluent with the narrower combustion stability limit may be selected as the second diluent.

At 306, it may be determined if the desired engine dilution can be provided in entirety by the first selected diluent. For example, as elaborated with reference to FIG. 2, an amount of the first diluent required to provide the desired dilution (under the given engine operating conditions) may be compared to an amount of the first diluent that is available (under the given engine operating conditions). If the required amount of first diluent is available, then the desired dilution can be provided by the first diluent only. If yes, the routine may proceed to 312 wherein an amount of the selected diluent may be further adjusted based on engine operating limitations. For example, as elaborated with reference to FIG. 5, an initial amount of first diluent may be determined and then the amount may be adjusted based on an engine operating limitation, such as one or more of exhaust particulate matter (PM) content, exhaust temperature, likelihood of pre-ignition, and torque limitations. The adjusted amount of the first diluent may then be provided to the engine.

Returning to 306, if the desired dilution cannot be provided by only the first diluent, then at 308, one or more diluents may be combined. Specifically, the method includes, after selecting a first diluent with a first higher combustion stability limit to provide at least some of the desired engine dilution, additional diluents may be selected. As an example, after the first diluent reaches the first combustion stability limit, the controller may select a second diluent with a second combustion stability limit lower than the first combustion stability limit to provide a remainder of the desired engine dilution. If the remainder of the desired engine dilution cannot be provided by the second diluent and/or if the second diluent becomes combustion stability limited, then a third diluent with a third combustion stability that is lower than each of the first and second combustion stability limits may be selected, and so on.

Figure 4:
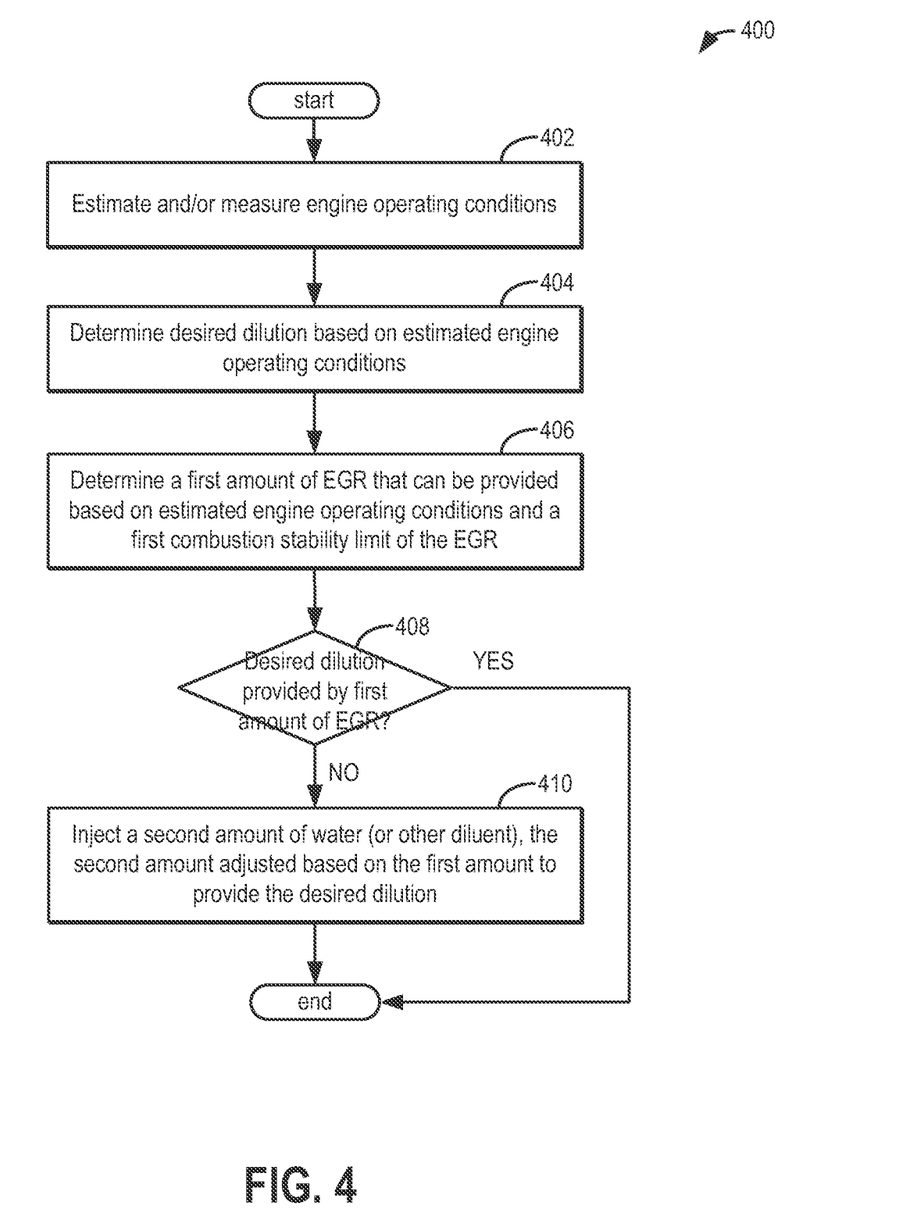
FIG. 4 shows a high level flow chart for adjusting a ratio of EGR and direct injected water to provide a desired engine dilution.
Figure 5:
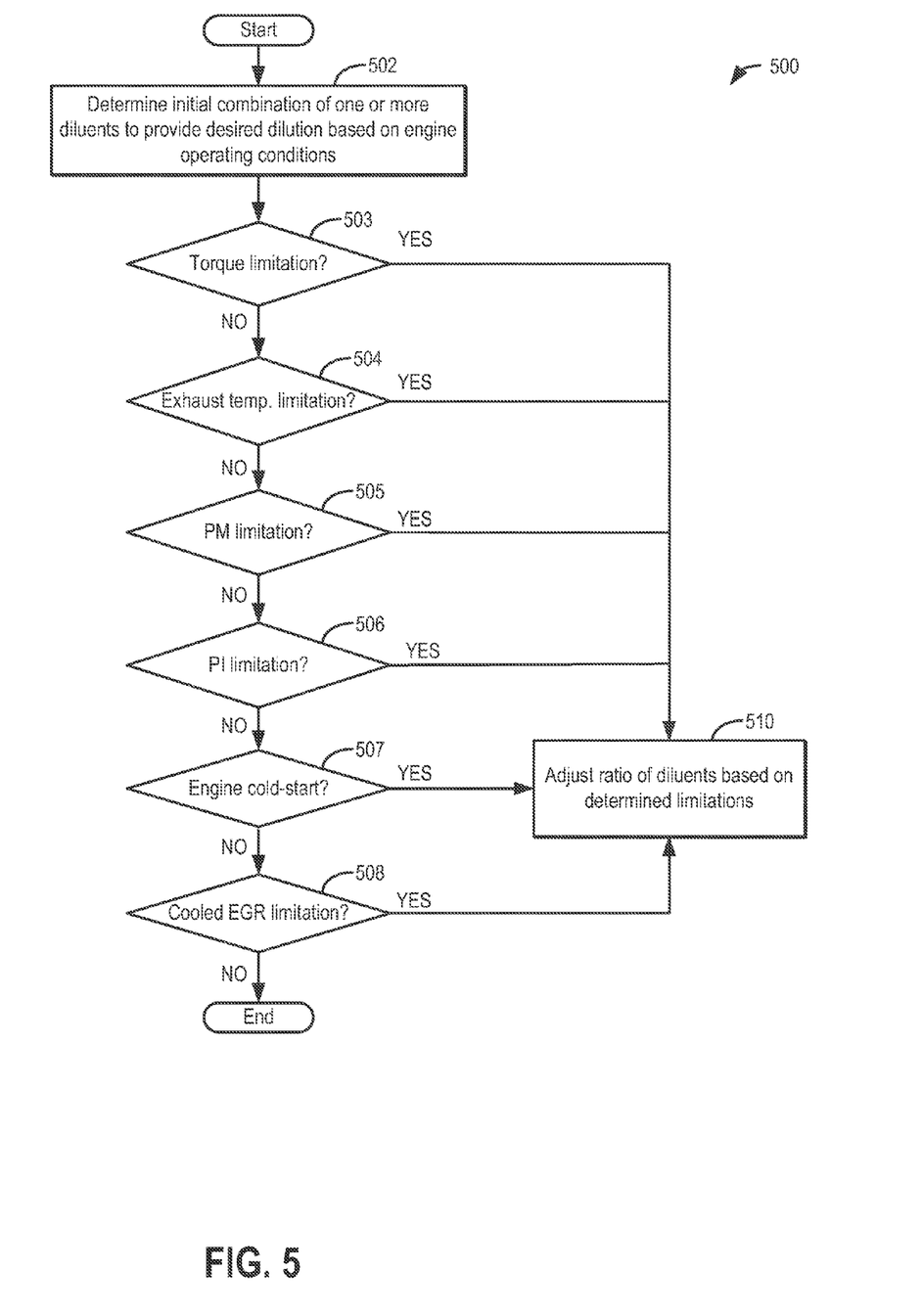
FIG. 5 shows a high level flow chart for further adjusting a ratio of the combination of diluents based on engine operating limitations.

In one example, as further elaborated with reference to the example of FIG. 4, the first diluent may include EGR while the second diluent may include direct injected water. Herein, the first combustion stability limit of the first diluent is higher than the second combustion stability limit of the second diluent. Additionally, the first combustion stability limit of the first diluent may be a wider combustion stability range than the second combustion stability limit of the second diluent.

Next, the routine may proceed to 312 wherein an amount and ratio of the selected diluents may be further adjusted based on engine operating limitations. For example, as elaborated with reference to FIG. 5, an initial ratio of first diluent relative to second diluent may be determined and then the ratio of the first diluent and second diluent may be adjusted based on the combustion stability limit of each diluent in the combination, as well as based on engine operating limitations. These limitations may include one or more of exhaust particulate matter (PM) content, exhaust temperature, likelihood of pre-ignition, and torque limitations, for example. Adjusting the ratio may include, for example, during a first condition, such as during low load operations, increasing air as diluent (that is, operating engine lean) or increasing internal EGR through VCT mechanisms as the engine has a higher tolerance to lean and hot EGR at low load conditions. In comparison, tt medium load conditions, the adjustment may include reducing lean combustion (e.g., reducing air as diluents) or decreasing internal EGR and increasing cooled EGR. At high load conditions, the adjusting may include reducing EGR and increasing water injection or fuel enrichment as diluent (e.g., increasing fuel injection) to reduce knock tendency, and to cool the exhaust and combustion temperatures.

In this way, a plurality of engine diluents may be combined to provide a desired engine dilution. One example of combining different diluents is shown in the example method of FIG. 4. Therein, EGR and direct injection of water is combined to provide a desired engine dilution to address engine knock.

At 402, engine operating conditions may be estimated and/or measured. At 404, a desired engine dilution may be determined based on engine operating conditions. As elaborated previously at FIG. 2, this includes determining a feed-forward likelihood of engine knock based on the estimated engine operating conditions and determining an engine dilution required to address the feed-forward likelihood of engine knock.

In the depicted method, EGR may be selected as the first diluent and direct injected water may be selected as the second diluent. Accordingly, at 406, a first amount of EGR that can be provided to meet the desired engine dilution may be determined. This first amount of EGR may be determined based on the estimated engine operating conditions and a first combustion stability limit of the EGR. Next, at 408, it may be determined if the first amount of EGR is sufficient to provide the desired dilution. If yes, the routine may end and the desired dilution may be provided by the first amount of EGR. If not, then at 410, a second amount of direct injected water may be determined to provide the remainder of the desired dilution. The second amount may be based on the first amount of EGR and the combustion stability limit of the EGR, as well as a combustion stability limit of the water.

Thus, in the depicted method, a controller may recirculate a first amount of exhaust gas from an engine exhaust to an engine intake and inject a second amount of engine diluent (herein water) to provide a desired engine dilution. Herein, the second amount may be based on a combustion stability limit of the first amount of exhaust gas, and further, the first and second amounts may be adjusted to provide the desired engine dilution. In one example, the controller may recirculate the first amount of exhaust gas to provide at least some of the desired engine dilution until a first combustion stability limit of the exhaust gas recirculation is reached. Then, after reaching the first combustion stability limit, the controller may inject the second amount of the subsequent engine diluent(s) to provide a remainder of the desired engine dilution. Herein, the first combustion stability limit of the EGR is higher than the second combustion stability limit of the second diluent (direct injected water). In an alternate example, the first combustion stability limit may also have a wider range than the second combustion stability limit.

It will be appreciated that while the depicted example uses direct injected water as a second diluent, in an alternate example, the second engine diluent may include variable cam timing. Still other engine diluents may be used, such as, a lean combustion, a variable valve timing, humidity, etc.

It will be further appreciated that in the depicted method, the desired engine dilution provided by the combination of selected diluents, is based on a feed-forward indication of knock. A controller may be further configured to, in response to a feedback indication of knock, inject a knock control fluid and adjust a combustion stability limit of the EGR and the engine diluent(s) based on the injected knock control fluid.

Now turning to FIG. 5, an example method 500 is shown for adjusting a ratio of the amounts of various diluents used to provide a desired engine dilution based on one or more engine operating limitations. By adjusting the ratio based on the limitations, the desired dilution may be provided without degrading exhaust emissions and while reducing the potential for EGR and/or torque transients.

At 502, an initial combination of one or more engine diluents may be selected to provide to the desired engine dilution. The initial combination may include selecting the diluents from a pool of available diluents based on engine operating conditions and respective combustion stability limits (of the diluents).

At 503, it may be determined if there are any torque limitations. In one example, torque limitations may be present at low speed and low load conditions. For improved torque performance at low speed (RPM) conditions, the controller may reduce the use of lean operation, internal EGR, and cooled EGR as diluents and substitute with water injection for engine dilution. Herein, the water injection will provide the diluent for reducing combustion temperatures, reducing knock tendency, and increase volumetric efficiency to get a higher torque. To reduce the torque, the controller may increase the lean air/fuel operation or increase internal EGR through VCT adjustments. As such, these two actions allow for quick adjustment of torque through diluent management. If torque limitations are present, then at 510, a ratio if the diluents may be adjusted. For example, an amount of EGR may be increased while an amount of direct injected water may be decreased.

At 504, it may be determined if there are any exhaust temperature limitations. In one example, elevated exhaust temperatures may occur at high and very high speed and load conditions. Under such conditions, the use of internal EGR/residuals as a diluent may lead to elevated exhaust temperatures. In contrast, direct injected water may provide a charge cooling effect that leads to lower exhaust temperatures. Elevated exhaust temperature issues may also lead to turbocharger issues due to elevated turbine inlet temperatures. If confirmed, the exhaust temperature limitations may be addressed by adjusting the ratio of diluents in use at 510 based on the exhaust temperature limitations. For example, an amount of EGR may be decreased while an amount of direct injected water may be increased.

At 505, it may be determined if there are any particulate matter (PM) limitations. In one example, elevated particulate matter emissions may occur under some selected combinations of speed, load and temperature conditions. Under such conditions, the use of fuel enrichment as a diluent may increase the PM emissions. In contrast, direct injected water or alcohol fuels may inherently generate lower levels of PMs. The PM limitations may be addressed at 510 by adjusting the ratio of the selected diluents based on the PM limitations. For example, an amount of fuel enrichment may be decreased while an amount of direct injected water may be increased.

At 506, it may be determined if there is a likelihood of pre-ignition. In one example, pre-ignition may occur at low speed and high load conditions. Under such conditions, the use of internal EGR as a diluent may increase the occurrence of pre-ignition. In contrast, direct injected water and/or alcohol fuels may generate a charge cooling effect that may reduce the occurrence of pre-ignition. Thus, at 510, the pre-ignition limitations may be addressed by adjusting the ratio of the selected diluents based on the pre-ignition limitation. For example, an amount of internal EGR may be decreased while an amount of direct injected water may be increased.

At 507, it may be determined if the dilution is required at an engine cold start (such as when an exhaust catalyst is below a light-off temperature). During such conditions, to address engine cold start emissions, a small amount of increase in hot internal EGR may be desired. The engine cold start limitations may be addressed at 510 by adjusting the ratio of the selected diluents. For example, an amount of internal EGR may be increased while an amount of water or hydrous ethanol injection is decreased.

At 508, it may be determined if there are cooled-EGR limitations. In one example, cooled EGR may become limited at low speed and medium load conditions. Under such conditions, the direct injection of a fluid, such as an ethanol fuel, water, or washer fluid, may generate a dilution effect that may rapidly provide the desired dilution while the cooled EGR is limited. Specifically, if under the low speed-medium load conditions, the cooled EGR level is not as high as requested, then by direct injecting water (or ethanol), the desired dilution may be substantially immediately provided, while the EGR flow is increased. Thus, at 510, the ratio of the selected diluents may be adjusted based on the cooler EGR limitation. For example, an amount of EGR may be decreased while an amount of direct injected water may be increased.

In one example, in response to a likelihood of knock, a controller may use EGR as a first selected diluent and recirculate a first amount of exhaust gas via an EGR passage until a first combustion stability limit of the EGR is reached. After the first combustion stability is reached, the controller may use direct injected water as a second diluent and direct inject a second amount of water into the engine cylinder until a second combustion stability limit of the direct injection is reached. Herein, the first and second amounts may be based on the likelihood of knock and each of the first and second combustion stability limits.

The controller may then adjust a ratio of the first and second amount based on an engine operating limitation, the limitation including one or more of exhaust PM content, exhaust temperature, likelihood of pre-ignition, and torque limitation. As an example, the adjusting may include increasing the second amount while decreasing the first amount in response to a pre-ignition limitation. As another example, the adjusting may include increasing the first amount while decreasing the second amount in response to an exhaust temperature limitation.

The controller may be further configured to, in response to a feedback indication of knock, direct inject a third amount of knock-control fluid into the cylinder. The controller may then adjust the first and second combustion stability limits of the EGR and direct injected water, respectively, based on the third amount of knock control fluid injected.

In this way, by adjusting a ratio of selected diluents based on their respective combustion stability limits as well as engine operating limitations, an engine dilution may be better provided with reduced engine transients and reduced exhaust emissions.

Figure 6:
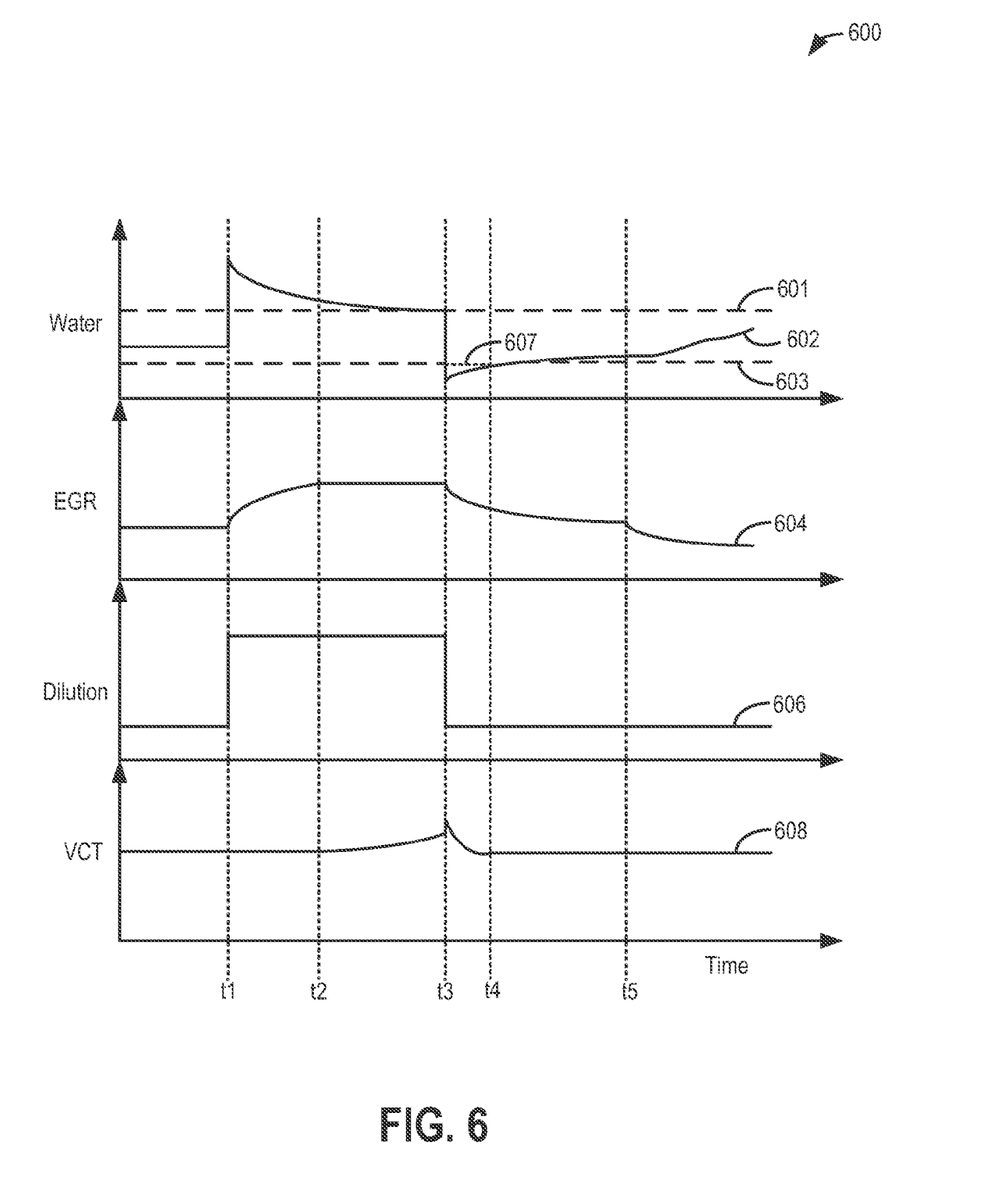
FIG. 6 shows a map illustrating an example usage of EGR and direct injection of water to provide engine dilution.

FIG. 6 illustrates the use of various engine diluents in addressing engine knock and providing an engine dilution at map 600. In particular, map 600 changes in an amount of direct injected water at graph 602, changes in an amount of exhaust gas that is recirculated from an engine exhaust to an engine intake at graph 604, and changes in a variable cam timing (VCT) setting at 608 as a desired engine dilution changes over time at graph 606. By adjusting the direct injection in coordination with EGR flow, a desired dilution may be provided while EGR transient control problems are reduced. It will be appreciated that while the depicted example is illustrated using water as the diluent, in alternate example, the diluent may be ethanol, methanol, another alcohol, wiper fluid, combinations thereof, or an alternate non-combustible fluid.

Before t1, based on engine operating conditions (such as, an engine speed and load condition), a desired dilution may be determined. Based on the desired dilution, an EGR flow, a VCT setting, and a water injection amount may be determined. At t1, a sudden increase in engine dilution may be requested. The increase in EGR flow may be requested due to a feed-forward anticipation of engine knock. For example, the increased dilution may be requested during a pedal tip-in (which in turn leads to a throttle tip-in) due to a sudden increase in the likelihood of engine knock. Accordingly, at t1, EGR may be selected as the first diluent (due to its highest combustion stability limit) and an amount of EGR flow may be increased. In one example, the EGR flow may be an LP-EGR flow received through an LP-EGR passage coupled between the engine intake upstream of a turbocharger compressor and the engine exhaust downstream of a turbocharger turbine. However, in alternate examples, the EGR flow may be a HP-EGR flow received through an HP-EGR passage coupled between the engine intake downstream of a turbocharger compressor and the engine exhaust upstream of a turbocharger turbine. The LP-EGR flow may be increased by the actuation of an LP-EGR valve in the LP-EGR passage.

However, there may be a delay from the time the LP-EGR valve is actuated and the time that the increased EGR flow is achieved and received at the cylinder. Specifically, the delay in mixing of EGR gases with intake air to achieve the desired EGR amount/flow and the arriving of the mixed EGR flow at the cylinder may lead to EGR transients that may transiently degrade engine efficiency. Thus, to compensate for the EGR transients and the related engine dilution transients, at t1, during an increase in EGR flow (such as, from a first amount of EGR to a second, higher, amount of EGR), a direct injection of water injection may be increased to a first water injection amount. Herein, the direct injected water is used as the second diluent based on its combustion stability limit. The substantially immediate vaporization of the direct injected water may provide a substantially immediate dilution effect in the cylinder that compensates for the EGR transients and allow the desired dilution to be substantially immediately provided. The amount of direct injection of water may be based on the amount of EGR in the EGR flow as well as the desired engine dilution. Thus, as the EGR flow gradually increases, the water injection may be decreased (e.g., to a second water injection amount lower than the first amount) so that the desired engine dilution level is substantially maintained. As shown in graph 602, the rate of increasing the water injection may be faster than the rate of decreasing the water injection. By adjusting and coordinating the water injection and the EGR flow, the desired dilution may be immediately provided.

At t2, while the engine dilution request is maintained, the EGR may become combustion stability limited. Thus, after t2, the EGR level may be maintained at or just below the combustion stability limited level. The deficiency in engine dilution may then be provided by corresponding adjustments in VCT settings. As shown herein, between t2 and t3, the engine dilution request remains substantially high. During this period, the EGR level is maintained, and while the water direct injection level decreases, the VCT setting may be increased so that the required dilution is met.

At t3, in response to a change in engine operating conditions, the requested dilution may decrease. In one example, the decreased dilution may be requested during a pedal tip-out. In response to the decrease in requested engine dilution, the water injection may be immediately decreased (to allow an immediate drop in dilution to occur) after which the water injection amount may be gradually increased. In one example, due to knock concerns, it may be desired to keep the amount of water direct injected within an upper threshold 601 and a lower threshold 603. At the same time, at t2, the EGR flow may also be decreased. Further, a VCT setting may be adjusted based on the change in water direct injection and further based on the change in EGR flow. For example, during the decrease in EGR flow initiated at t3, when the water injection amount required is smaller than lower threshold 603, the water injection amount may be returned to the lower threshold between t3 and t4 (or transiently held at the lower threshold for an amount of time between t3 and t4, as depicted by dotted segment 607), while a VCT setting is retarded (graph 608) for the same amount of time (between t3 and 4). Herein, by adjusting VCT based on the direct injection amount, the water injection may be kept at a threshold required to maintain knock while the desired engine dilution is provided at least partly and temporarily by the VCT.

In an alternate example (not depicted), when engine dilution is requested and while an EGR flow is increased, VCT may be advanced when the water injection amount required is greater than the upper threshold. Herein, the water injection may be held for an amount of time (e.g., transiently) at the upper threshold amount while VCT is advanced for the same period. It will be appreciated that the VCT adjustment used (e.g. VCT retard or advance) may be based on the VCT type. Thus, when the VCT is a first type, VCT advance may be used, and when the VCT is a second, different type, VCT retard may be used, to achieve the desired dilution effect.

At t5, in response to engine load being lower than a threshold, and EGR flow being lower than a threshold, an amount of water direct injected may be gradually increased. Herein, at the lower engine load, in anticipation of an increase in engine load (such as, due to a sudden tip-in), and a corresponding need for increased engine dilution, and in further anticipation of potential EGR transients (or dilution transients) arising from the delay in increasing an EGR flow, direct injection of water may be increased, albeit by a smaller amount, to at least partly provide some of the engine dilution that may be requested during the anticipated increase in engine load. Thus, in effect, a load leveling may be performed in anticipation of load changes.

In this way, changes in engine dilution may be better anticipated and addressed. By determining engine dilution requirements based on anticipated engine knock, and anticipated engine loads, based on engine load conditions, and by adjusting a combination of diluents that may be used to provide the desired engine dilution based on their respective combustion stability limits, knock may be better addressed. By mapping the engine based on the combustion stability limits of the available diluents, engine dilution control may be improved. Specifically, engine performance and diluent usage may be improved, while providing all the knock-addressing benefits of the engine dilution.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be further appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine, comprising:
providing a desired engine dilution by combining a plurality of engine diluents, the diluents and their ratio selected based on respective combustion stability limits, the providing including increasing a first amount of a first diluent while decreasing a second amount of a second diluent, the first and the second amounts based on a determination of knock.

2. The method of claim 1, wherein a combustion stability limit of each diluent is based on a type of the diluent.

3. The method of claim 2, wherein the combustion stability limit of a diluent is based on a concentration of each elemental constituent of the diluent.

4. The method of claim 1, wherein the combining includes, selecting the first diluent with a first higher combustion stability limit to provide at least some of the desired engine dilution; and
after the first diluent reaches a first combustion stability limit, selecting the second diluent with a second combustion stability limit lower than the first combustion stability limit to provide a remainder of the desired engine dilution.

5. The method of claim 4, wherein the first diluent includes EGR and wherein the second diluent includes direct injected water.

6. The method of claim 5, wherein the first combustion stability limit of the EGR is based on each of a carbon dioxide concentration, a nitrogen concentration, and a water concentration of the recirculated exhaust gas.

7. The method of claim 4, wherein the ratio of the first diluent and second diluent is further adjusted based on the combustion stability limit of each diluent in the combination.

8. The method of claim 7, wherein the providing the desired engine dilution by increasing a first amount of the first diluent while decreasing a second amount of the second diluent is performed during a first condition, the method further comprising during a second condition, decreasing the first amount of the first diluent while increasing the second amount of the second diluent.

9. The method of claim 8, wherein the first condition includes an engine knocking condition and during the first condition, a first amount of cooled EGR or water injection is increased while a second amount of internal EGR or hot EGR is decreased, and wherein the second condition includes cold start or low load engine operating conditions, and during the second condition, the second amount of hot EGR or internal EGR is increased while the first amount of cooled EGR or water injection is decreased.

10. The method of claim 1, wherein an amount of each selected diluent is adjusted based on the combustion stability limit of each diluent in the combination.

11. A method of operating an engine, comprising:
recirculating a first amount of exhaust gas from an engine exhaust to an engine intake to provide at least some of a desired engine dilution until a first combustion stability limit of the exhaust gas recirculation is reached; and
after reaching the first combustion stability limit, injecting a second amount of engine diluent to provide a remainder of the desired engine dilution, the second amount based on a combustion stability limit of the first amount of exhaust gas, the first and second amounts adjusted to provide the desired engine dilution, the second amount of exhaust gas engine diluent decreased as the first amount of recirculated exhaust gas is increased.

12. The method of claim 11, wherein the first combustion stability limit is higher than a second combustion stability limit of the engine diluent.

13. The method of claim 11, wherein the first combustion stability limit is a wider combustion stability limit range than a second combustion stability limit of the engine diluent.

14. The method of claim 11, wherein the second amount of engine diluent includes one of direct injected water and variable cam timing.

15. The method of claim 11, wherein the desired engine dilution is based on a feed-forward indication of knock, the method further comprising, in response to a feedback indication of knock, injecting a knock control fluid and adjusting a combustion stability limit of each of the recirculated exhaust gas and the engine diluent based on the injected knock control fluid.

16. An engine system, comprising:
an engine including an intake and an exhaust;
an injector configured to direct inject a fluid into an engine cylinder;
an EGR passage for recirculating an amount of exhaust gas from the engine exhaust to the engine intake;
a controller with computer readable instructions for:
in response to a likelihood of knock,
recirculating a first amount of exhaust gas via the EGR passage until a first combustion stability limit of the EGR is reached; and
after the first combustion stability is reached, direct injecting a second amount of water into the engine cylinder until a second combustion stability limit of the direct injection is reached, wherein the first and second amounts are based on the likelihood of knock and each of the first and second combustion stability limits, the second amount of water decreased as the first amount of exhaust gas recirculation is increased to provide a desired engine dilution.

17. The system of claim 16, wherein the controller includes further instructions for adjusting a ratio of the first and second amounts based on an engine operating limitation, the limitation including one or more of exhaust PM content, exhaust temperature, likelihood of pre-ignition, and torque limitation.

18. The system of claim 16, wherein the adjusting includes, increasing the second amount of direct injected water while decreasing the first amount of exhaust gas in response to a pre-ignition limitation, and increasing the first amount of exhaust gas while decreasing the second amount of direct injected water in response to an exhaust temperature limitation.

19. The system of claim 16, wherein the controller is further configured to,
in response to a feedback indication of knock,
direct inject a third amount of knock-control fluid into the cylinder; and
adjust the first and second combustion stability limits based on the third amount of knock-control fluid.

* * * * *